(12) United States Patent
Nuggehalli et al.

(10) Patent No.: US 9,894,246 B2
(45) Date of Patent: Feb. 13, 2018

(54) LOCKED PRINT WITH INTRUDER DETECTION AND MANAGEMENT

(71) Applicant: RICOH COMPANY, LTD., Tokyo (JP)

(72) Inventors: Jayasimha Nuggehalli, Cupertino, CA (US); Seiichi Katano, Cupertino, CA (US); Seong Kim, Saratoga, CA (US); Ke Wei, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/202,853

(22) Filed: Jul. 6, 2016

(65) Prior Publication Data

US 2016/0316105 A1  Oct. 27, 2016

Related U.S. Application Data

(63) Continuation of application No. 12/166,999, filed on Jul. 2, 2008, now Pat. No. 9,411,956.

(51) Int. Cl.
*G06K 15/00* (2006.01)
*G06F 3/12* (2006.01)
(Continued)

(52) U.S. Cl.
CPC ........... *H04N 1/4413* (2013.01); *G06F 21/31* (2013.01); *G06F 21/554* (2013.01);
(Continued)

(58) Field of Classification Search
None
See application file for complete search history.

(56) References Cited

U.S. PATENT DOCUMENTS 5,633,932 A   5/1997   Davis et al.
5,845,066 A   12/1998  Fukuzumi
(Continued)

FOREIGN PATENT DOCUMENTS

EP   0657 845 A2   11/1994
EP   1 091 275      4/2001
(Continued)

OTHER PUBLICATIONS

U.S. Appl. No. 12/166,999, filed Jul. 2, 2008, Final Office Action, Jun. 6, 2012.
(Continued)

*Primary Examiner* — Marcus T Riley
(74) *Attorney, Agent, or Firm* — Hickman Palermo Becker Bingham LLP; Edward A. Becker

(57) ABSTRACT

A printing device includes a user interface, a print module and a locked print module. The locked print module is configured to examine a plurality of print data received by the printing device to determine whether locked printing is specified for any electronic documents contained in the plurality of print data. If locked printing is specified for any of the electronic documents contained in the plurality of print data, then the corresponding print data is stored on the printing device and not processed for printing. The locked print module is further configured to verify password data with respect to user identification data. If the password data is not successfully verified with respect to the user identification data, then the locked print module causes print data that is both stored on the printing device and associated with the user identification data to be deleted from the printing device.

20 Claims, 7 Drawing Sheets

(51) Int. Cl.
  *H04N 1/44* (2006.01)
  *G06F 21/55* (2013.01)
  *G06F 21/60* (2013.01)
  *G06F 21/31* (2013.01)
  *H04N 1/00* (2006.01)

(52) U.S. Cl.
  CPC ....... *G06F 21/608* (2013.01); *H04N 1/00411* (2013.01); *G06F 2221/2143* (2013.01); *H04N 2201/0094* (2013.01)

(56) References Cited

U.S. PATENT DOCUMENTS

| | | |
|---|---|---|
| 5,880,447 A | 3/1999 | Okada et al. |
| 5,970,218 A | 10/1999 | Mullin et al. |
| 6,161,139 A | 12/2000 | Win et al. |
| 6,614,546 B1 | 9/2003 | Kurozasa |
| 6,735,665 B1 | 5/2004 | Kumagai et al. |
| 6,862,583 B1 | 3/2005 | Mazzagatte et al. |
| 6,880,124 B1 | 4/2005 | Moore |
| 6,938,154 B1 | 8/2005 | Berson et al. |
| 6,970,259 B1 | 11/2005 | Lunt et al. |
| 6,973,671 B1 | 12/2005 | Hsing et al. |
| 7,002,703 B2 | 2/2006 | Parry |
| 7,079,269 B2 | 7/2006 | Teeuwen et al. |
| 7,110,541 B1 | 9/2006 | Lunt et al. |
| 7,170,623 B2 | 1/2007 | Matoba et al. |
| 7,224,477 B2 | 5/2007 | Gassho et al. |
| 7,359,076 B2 | 4/2008 | Uchino |
| 7,382,487 B2 | 6/2008 | Ikegami |
| 7,450,260 B2 | 11/2008 | Takeda et al. |
| 7,609,412 B2 | 10/2009 | Maruyama |
| 7,660,803 B2 | 2/2010 | Jin |
| 7,667,865 B2 | 2/2010 | Ciriza et al. |
| 7,697,760 B2 | 4/2010 | Kwok et al. |
| 7,797,328 B2 | 9/2010 | Styles |
| 8,130,392 B2 | 3/2012 | Kato |
| 8,302,205 B2 | 10/2012 | Kanai |
| 8,363,243 B2 | 1/2013 | Nuggehalli |
| 2001/0029521 A1 | 10/2001 | Matsuda et al. |
| 2001/0038462 A1 | 11/2001 | Teeuwen et al. |
| 2002/0002503 A1 | 1/2002 | Matsuoka |
| 2002/0021902 A1 | 2/2002 | Hosoda et al. |
| 2002/0023143 A1 | 2/2002 | Stephenson et al. |
| 2002/0041394 A1 | 4/2002 | Aoki |
| 2002/0054333 A1 | 5/2002 | Yamamoto et al. |
| 2002/0059322 A1 | 5/2002 | Miyazaki et al. |
| 2002/0097431 A1 | 7/2002 | Ikegami |
| 2002/0120855 A1 | 8/2002 | Wiley et al. |
| 2003/0044009 A1 | 3/2003 | Dathathraya |
| 2003/0065404 A1 | 4/2003 | Bhatti |
| 2003/0090696 A1 | 5/2003 | Willis et al. |
| 2003/0090697 A1 | 5/2003 | Lester et al. |
| 2004/0019671 A1 | 1/2004 | Metz |
| 2004/0056889 A1 | 3/2004 | Katano |
| 2004/0088378 A1 | 5/2004 | Moats |
| 2004/0090652 A1 | 5/2004 | Yoon |
| 2004/0095595 A1 | 5/2004 | Jacobsen |
| 2004/0118911 A1 | 6/2004 | Black et al. |
| 2004/0125402 A1 | 7/2004 | Kanai et al. |
| 2004/0140611 A1 | 7/2004 | Mui et al. |
| 2004/0156068 A1* | 8/2004 | Yoshida .............. G06F 21/608 358/1.13 |
| 2004/0159783 A1 | 8/2004 | Gavin et al. |
| 2004/0169884 A1 | 9/2004 | Yamada |
| 2004/0196492 A1 | 10/2004 | Johnson et al. |
| 2004/0239992 A1 | 12/2004 | Kawai et al. |
| 2004/0246515 A1 | 12/2004 | Patton et al. |
| 2004/0257601 A1 | 12/2004 | Tomiyasu et al. |
| 2004/0257613 A1 | 12/2004 | Okabe et al. |
| 2004/0263870 A1 | 12/2004 | Itoh et al. |
| 2005/0030151 A1 | 2/2005 | Singh |
| 2005/0039044 A1 | 2/2005 | Gassho et al. |
| 2005/0046876 A1 | 3/2005 | Burget et al. |
| 2005/0068547 A1 | 3/2005 | Negishi et al. |
| 2005/0094195 A1 | 5/2005 | Sakamoto et al. |
| 2005/0100378 A1 | 5/2005 | Kimura et al. |
| 2005/0141013 A1 | 6/2005 | Kikuchi et al. |
| 2005/0149755 A1 | 7/2005 | Shima et al. |
| 2005/0152543 A1 | 7/2005 | Shima et al. |
| 2005/0154884 A1 | 7/2005 | Van Den Tillaart |
| 2005/0168769 A1 | 8/2005 | Kim et al. |
| 2005/0182508 A1 | 8/2005 | Niimi et al. |
| 2005/0182822 A1 | 8/2005 | Daniel et al. |
| 2005/0183141 A1 | 8/2005 | Sawada |
| 2005/0213136 A1 | 9/2005 | Noyama et al. |
| 2005/0229189 A1 | 10/2005 | McManus |
| 2005/0254086 A1 | 11/2005 | Shouno |
| 2005/0268089 A1 | 12/2005 | Kim et al. |
| 2005/0273843 A1 | 12/2005 | Shigeeda |
| 2005/0273852 A1 | 12/2005 | Ferlitsch |
| 2005/0276618 A1 | 12/2005 | Clement et al. |
| 2006/0017954 A1 | 1/2006 | Ly et al. |
| 2006/0028672 A1 | 2/2006 | Abiko |
| 2006/0044589 A1 | 3/2006 | Nakagawaji |
| 2006/0044607 A1 | 3/2006 | Kato |
| 2006/0112270 A1 | 5/2006 | Erez |
| 2006/0268315 A1 | 11/2006 | Randt |
| 2006/0279760 A1 | 12/2006 | Wang et al. |
| 2006/0279761 A1 | 12/2006 | Wang et al. |
| 2006/0279768 A1 | 12/2006 | Wang et al. |
| 2007/0022467 A1 | 1/2007 | Filbrich |
| 2007/0041045 A1 | 2/2007 | Sato |
| 2007/0091360 A1 | 4/2007 | Iizuka |
| 2007/0133044 A1 | 6/2007 | Tanaka |
| 2007/0139695 A1 | 6/2007 | Young et al. |
| 2007/0146768 A1 | 6/2007 | Isoda |
| 2007/0177920 A1 | 8/2007 | Katano et al. |
| 2008/0030772 A1 | 2/2008 | Shirai |
| 2008/0037052 A1 | 2/2008 | Nishiguchi |
| 2008/0066185 A1 | 3/2008 | Lester et al. |
| 2008/0114922 A1 | 5/2008 | Chou et al. |
| 2008/0117452 A1* | 5/2008 | Murakami .......... G06F 21/608 358/1.15 |
| 2008/0189598 A1 | 8/2008 | Yoshida |
| 2008/0201784 A1 | 8/2008 | Someshwar |
| 2009/0147698 A1 | 6/2009 | Potvin |
| 2009/0185223 A1 | 7/2009 | Kanai et al. |
| 2009/0244594 A1 | 10/2009 | Nuggehalli |
| 2009/0244595 A1* | 10/2009 | Kim .................. G06F 21/31 358/1.15 |
| 2009/0244596 A1 | 10/2009 | Katano |
| 2009/0316183 A1* | 12/2009 | Wei .................. G06F 21/608 358/1.15 |
| 2010/0002249 A1* | 1/2010 | Nuggehalli ......... G06F 21/554 358/1.14 |
| 2010/0253968 A1 | 10/2010 | Nuggehalli |
| 2010/0265529 A1 | 10/2010 | Katano |
| 2011/0013219 A1 | 1/2011 | Nuggehalli et al. |
| 2012/0002234 A1 | 1/2012 | Wang |
| 2012/0140264 A1 | 6/2012 | Nuggehalli |
| 2013/0083363 A1 | 4/2013 | Kim |
| 2013/0169991 A1 | 7/2013 | Nuggehalli |

FOREIGN PATENT DOCUMENTS

| | | |
|---|---|---|
| EP | 1 143 695 | 10/2001 |
| EP | 1229 724 | 8/2002 |
| EP | 1 465 052 A2 | 10/2004 |
| EP | 1 566 719 A2 | 2/2005 |
| EP | 1 511 287 | 3/2005 |
| EP | 1621994 A | 2/2006 |
| JP | 4235667 A | 8/1992 |
| JP | 6152814 A | 5/1994 |
| JP | H6-095464 | 8/1994 |
| JP | 10207660 A | 8/1998 |
| JP | 11-191043 | 7/1999 |
| JP | 2001067201 A | 3/2001 |
| JP | 2001125982 A | 5/2001 |
| JP | 2001217948 A | 8/2001 |
| JP | 2002007095 A | 1/2002 |
| JP | 2002175241 A | 6/2002 |
| JP | 2002199153 A | 7/2002 |

(56) References Cited

FOREIGN PATENT DOCUMENTS

| | | |
|---|---|---|
| JP | 2002-312146 | 10/2002 |
| JP | 2004181647 A | 7/2004 |
| JP | 2004-221979 | 8/2004 |
| JP | 2004287824 | 10/2004 |
| JP | 2005074772 | 3/2005 |
| JP | 2005092731 | 4/2005 |
| JP | 2005178070 A | 7/2005 |
| JP | 2005196741 A | 7/2005 |
| JP | 2005-225099 | 8/2005 |
| JP | 2006205374 A | 8/2006 |
| JP | 2006205374 A | 8/2006 |
| JP | 2006227908 A | 8/2006 |
| JP | 2006231675 A | 9/2006 |
| JP | 2006252142 A | 9/2006 |
| JP | 2006252142 A | 9/2006 |
| JP | 2006-341404 | 12/2006 |
| JP | 2007055022 A | 3/2007 |
| JP | 2007-140916 | 7/2007 |
| JP | 2007-176082 | 7/2007 |
| JP | 2007188477 A | 7/2007 |
| JP | 2007203736 A | 8/2007 |
| JP | 2007203736 A | 8/2007 |
| JP | 2007-241939 | 9/2007 |
| JP | 2007-304931 | 11/2007 |
| JP | 2007290396 | 11/2007 |
| JP | 2007290396 A | 11/2007 |
| JP | 2008-040981 | 2/2008 |
| JP | 2008-97115 | 4/2008 |
| JP | 2008103867 A | 5/2008 |
| JP | 2008103867 A | 5/2008 |
| WO | WO 00/68817 A | 11/2000 |

OTHER PUBLICATIONS

U.S. Appl. No. 12/166,999, filed Jul. 2, 2008, Notice of Allowance, Apr. 12, 2016.
U.S. Appl. No. 12/166,999, filed Jul. 2, 2008, Examiner's Answer, Dec. 18, 2013.
U.S. Appl. No. 12/166,999, filed Jan. 29, 2016, Decision on Appeal, Jan. 29, 2016.
U.S. Appl. No. 12/166,999, filed Jul. 2, 2008, Final Office Action, Jan. 3, 2013.
U.S. Appl. No. 12/166,999, filed Jul. 2, 2008, Advisory Action, Mar. 18, 2013.
European Patent Office, "Search Report" in application No. EP 09 15 6660, dated Jul. 6, 2009, 7 pages.
European Patent Office, "Search Report" in application No. EP 07252112, dated Mar. 1, 2010, 6 pages.
European Patent Office, "Search Report" in application No. 09164263.7, dated May 4, 2012, 6 pages.
European Patent Office, "Search Report" in application No. 09156641, dated Jul. 2, 2009, 8 pages.
European Patent Office, "Search Report" in application No. 08 153 757.3-1870, dated Mar. 22, 2016, 4 pages.
European Patent Office, "Search Report" in application No. 07250426.9-1245, dated Jun. 12, 2008, 19 pages.
European Patent Office, Search Report in application No. 09 156 660.4, dated Sep. 18, 2013, 6 pages.
European Patent Office, "Office Action" in application No. 07 252 112.3-1959, dated Nov. 28, 2013, 5 pages.
European Claims in application No. 07250426.9-1245, dated Jun. 2008 , 2 pages.

* cited by examiner

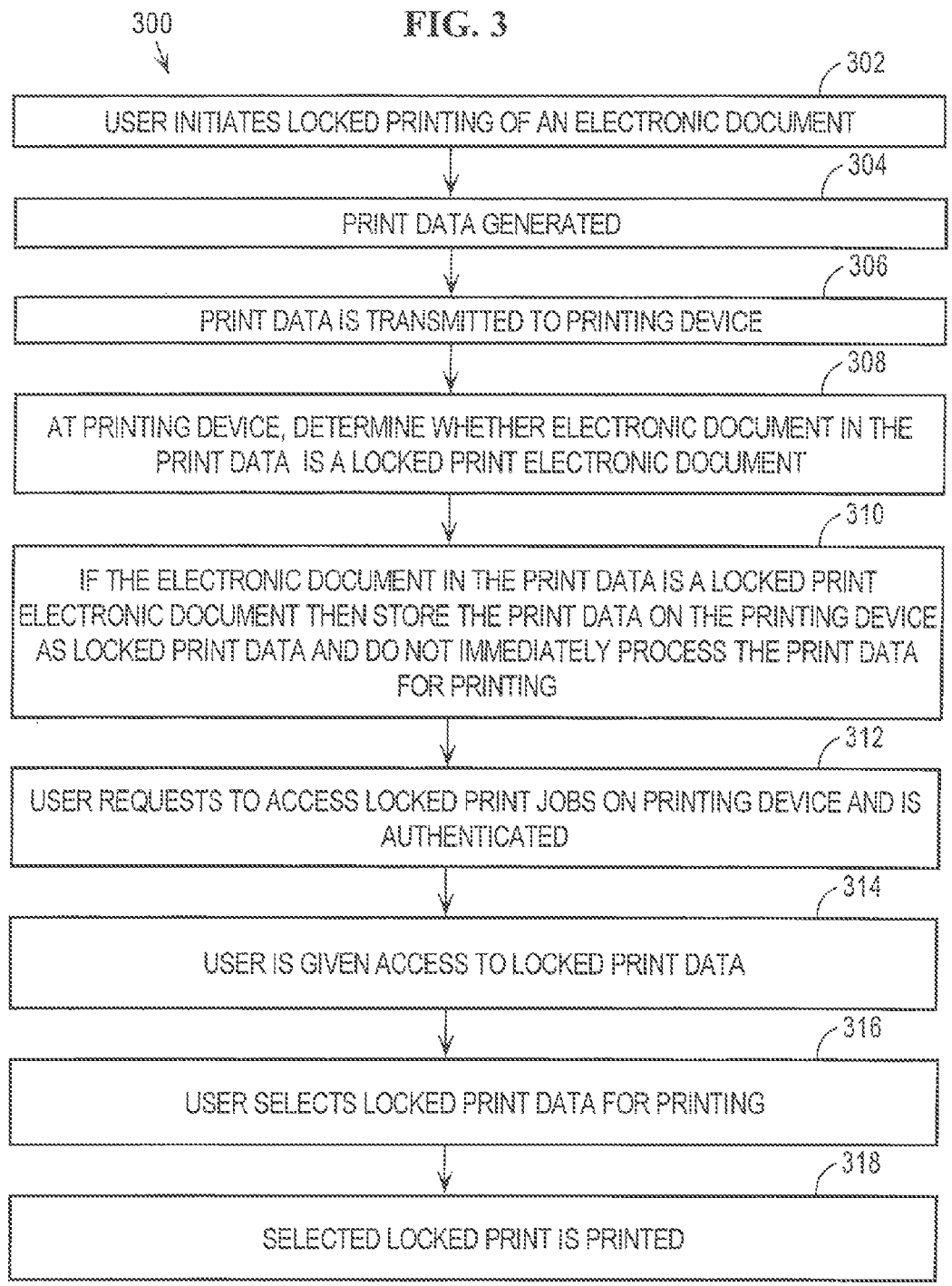

FIG. 4A

Select your User ID from Local Jobs

Local Jobs | Locked Print

[All] [0-9] [AB] [CD] [EF] [GH] [IJK] [LMN] [OPQ] [RST] [UVW] [XYZ]

[jay] [kewei] [seiichi] [test]

1/1
[Previous]
[Next]

[System Status] [Job List]  JUL 23,2007 1:35PM

Select User

FIG. 4B

Select your User ID from Local User List

Local Jobs \ Remote Jobs \ Locked Print

[All] [0-9] [AB] [CD] [EF] [GH] [IJK] [LMN] [OPQ] [RST] [UVW] [XYZ]

[fly]

⚠ Enter the password with the number keys, then press [OK].
User ID: fly
Password: **** [Clear]
[Cancel] [OK]

1/1
[Previous]
[Next]

[System Status] [Job List]  MAR 7,2007 1:54PM

Enter Password

FIG. 4C

| | Job Name | Page | Date/Time | |
|---|---|---|---|---|
| User ID: paul Total: 3 jobs 1/1 [Previous] [Next] | [X] paul -- xl_auto.doc | 0001 | Fri Sep 15 11:18:31 2006 | [Exit] |
| | [X] paul Seauto | 0001 | Fri Sep 15 11:18:32 2006 | |
| | [X] paul ps_auto.doc | 0001 | Fri Sep 15 11:18:33 2006 | [Print] [Delete] [Deselect All] |

[System Status] [Job List]  SEP 15,2006 11:52AM

Select Job and Press 'Print' button

FIG. 5

| JOB ID | USER ID | PASSWORD | TIME STAMP | JOB NAME | PAGE COUNT | PRINT COUNT |
|---|---|---|---|---|---|---|
| 01 | USER 1 | PASS1 | T1 | JOB1 | 11 | 2 |
| 02 | USER 2 | PASS2 | T2 | JOB2 | 2 | 3 |
| N | USER N | PASSN | TN | JOBN | 14 | 1 |

JOB TABLE 500

LOCKED PRINT WITH INTRUDER DETECTION AND MANAGEMENT

RELATED APPLICATION DATA

This application claims the benefit, under 35 U.S.C. § 120, as a Continuation of U.S. patent application Ser. No. 12/166,999 filed Jul. 2, 2008, titled "LOCKED PRINT WITH INTRUDER DETECTION AND MANAGEMENT," the entire contents of each of which is hereby incorporated by reference as if fully set forth herein.

This application is related to U.S. patent application Ser. No. 12/059,836 entitled APPROACH FOR PRINTING POLICY-ENABLED ELECTRONIC DOCUMENTS USING LOCKED PRINTING, filed Mar. 31, 2008; U.S. patent application Ser. No. 12/059,916 entitled APPROACH FOR PROCESSING PRINT DATA USING PASSWORD CONTROL DATA, filed Mar. 31, 2008; U.S. patent application Ser. No. 12/059,986 entitled APPROACH FOR PRINTING POLICY-ENABLED ELECTRONIC DOCUMENTS USING LOCKED PRINTING AND A SHARED MEMORY DATA STRUCTURE, filed Mar. 31, 2008, the contents all of which are incorporated by reference in their entirety for all purposes as if fully set forth herein.

FIELD OF THE INVENTION

This invention relates generally to printing of electronic documents.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The proliferation of communications networks, and in particular the Internet, has raised growing concerns about the security of information transmitted over networks. Numerous protection schemes have been implemented to secure electronic documents transmitted over the Internet, ranging from simple passwords to strong encryption. Some printing devices are configured with a feature known as "locked printing" to provide control over the printing of electronic documents. When a printing device is configured with a locked printing feature and print data is sent to the printing device, a printed version of an electronic document reflected in the print data is not generated until a user is verified at the printing device. Typically a user enters authentication data, such as a password, through an operation panel on the printing device. The printing device verifies the authentication data and if the authentication data is successfully verified, allows a printed version of the electronic document reflected in the print data to be generated, i.e., printed.

One of the problems with conventional locked printing approaches is that the documents stored on a printing device are susceptible to unauthorized access by third parties. Locke print documents are conventionally stored on a printing device until an authorized user prints the locked print electronic documents. During that time, an unauthorized third party may attempt to enter valid authentication data and gain access to the locked print data stored on the printing device. This is particularly problematic in situations where the locked print data contains sensitive information.

Based on the foregoing, there is a need for an approach for securely printing electronic documents that does not suffer from limitations of prior approaches.

SUMMARY

An approach is provided for implementing locked printing on a printing device. A printing device includes a user interface, a print module and a locked print module. The user interface is configured to process print data and cause a printed version of an electronic document contained in the print data to be generated by the printing device. The locked print module is configured to examine a plurality of print data received by the printing device to determine whether locked printing is specified for any electronic documents contained in the plurality of print data. If, for any of the print data from the plurality of print data, locked printing is specified for the electronic document contained in the print data, then the print data, from the plurality of print data, for which locked printing is specified for the electronic document contained in the print data, is stored at the printing device as locked print data instead of being processed for printing. The locked print module is further configured to verify password data with respect to user identification data received via the user interface. If the password data is successfully verified with respect to the user identification data, then a user is allowed access to print data associated with the user identification data. If the password data is not successfully verified with respect to the user identification data, then the locked print module increments a fail count, compares the fail count to a specified value, and in response to comparing the fail count to the specified value, then causing locked print data that is both stored on the printing device and associated with the user identification data to be deleted from the printing device. The approach may also be implemented via one or more non-transitory computer-readable media or computer-implemented methods.

BRIEF DESCRIPTION OF THE DRAWINGS

In the figures of the accompanying drawings like reference numerals refer to similar elements.

FIG. 3 is a flow diagram that depicts an approach for printing a policy-enabled electronic document using locked printing, according to one embodiment of the invention FIGS. 4A-4C depict an example graphical user interface that may be displayed on a user interface of a printing device.

FIG. 5 is a block diagram that depicts a job table that may be included in or stored in association with locked print data.

DETAILED DESCRIPTION

Figure 1:
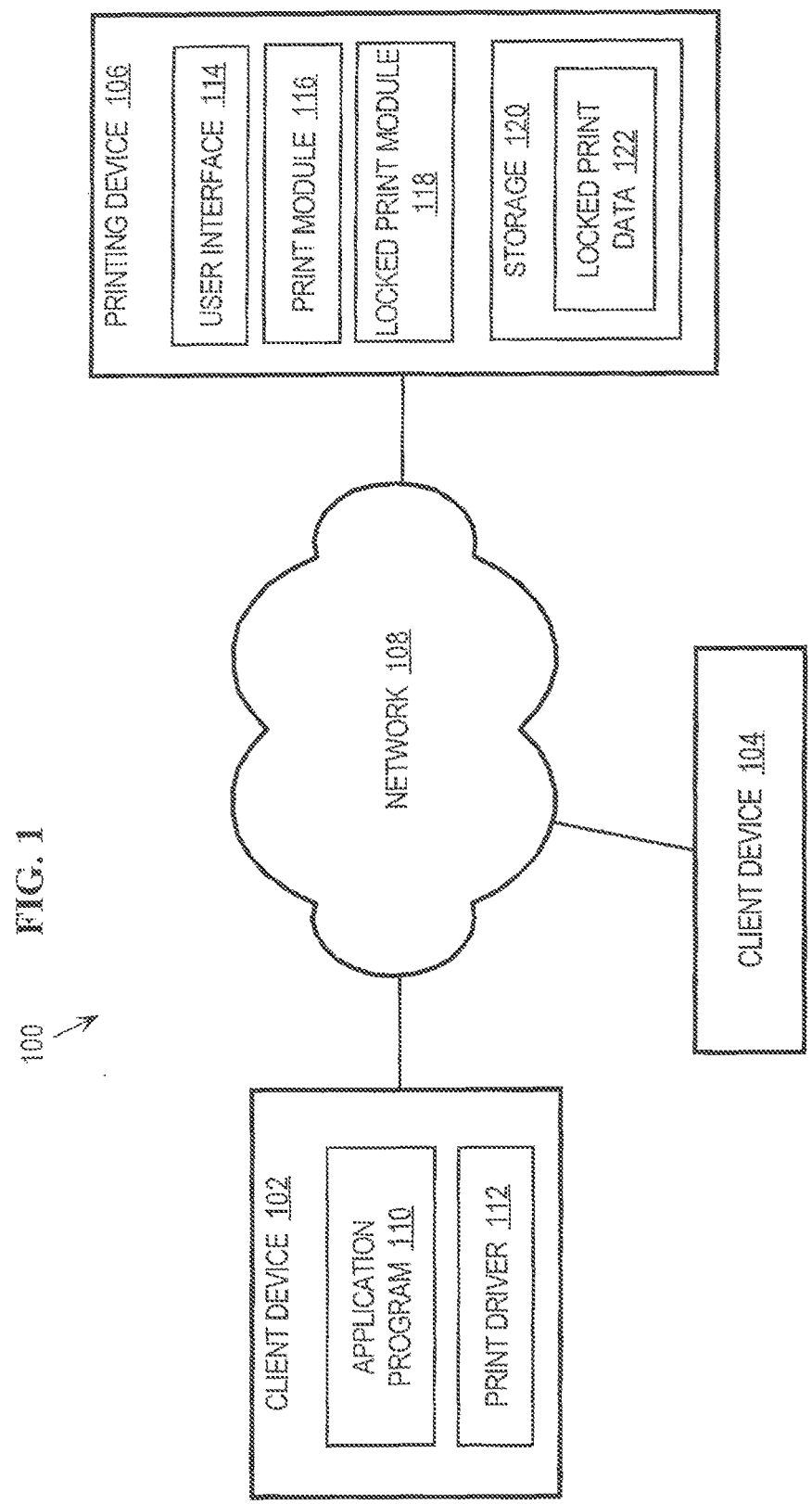
FIG. 1 is a block diagram that depicts an arrangement for printing policy-enabled electronic documents using locked printing according to an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. ARCHITECTURE FOR LOCKED PRINTING WITH INTRUDER DETECTION AND MANAGEMENT
III. PROCESSING PRINT DATA USING LOCKED PRINTING
IV. INTRUDER DETECTION AND MANAGEMENT
V. NOTIFICATION OF INTRUDER DETECTIONS
VI. IMPLEMENTATION MECHANISMS

I. OVERVIEW

An approach is provided for implementing locked printing on a printing device that includes intruder detection and management. A printing device includes a user interface, a print module and a locked print module. The user interface is configured to process print data and cause a printed version of an electronic document contained in the print data to be generated by the printing device. The locked print module is configured to examine a plurality of print data received by the printing device to determine whether locked printing is specified for any electronic documents contained in the plurality of print data. If locked printing is specified for any of the electronic documents contained in the plurality of print data, then the corresponding print data is stored on the printing device and not processed for printing. The locked print module is further configured to verify password data with respect to user identification data received via the user interface. If the password data is successfully verified with respect to the user identification data, then a user is allowed access to print data associated with the user identification data. If the password data is not successfully verified with respect to the user identification data, then the locked print module causes print data that is both stored on the printing device and associated with the user identification data to be deleted from the printing device. The locked print module is also configured to verify multiple passwords for particular user identification data and if at least a specified number of the passwords are not able to be verified, then the locked print module causes the print data to be deleted from the printing device. This allows for accidental entering of incorrect password data without causing the deletion of print data. The print data selected for deletion may be associated with only the user identification data, or the print data may be associated with both the user identification data and other user identification data from a plurality of user identification data. In addition to causing the deletion of print data stored on the printing device, the locked print module may also cause the user identification data to be deleted from the printing device. The locked print module may also cause one or more notifications to be generated and transmitted that indicate that the verification of the password data with respect to the user identification data was not successful.

This approach provides additional protection of locked print data, which is particularly useful in situations where locked print data contains sensitive or confidential information.

II. ARCHITECTURE FOR LOCKED PRINTING WITH INTRUDER DETECTION AND MANAGEMENT

FIG. 1 is a block diagram that depicts an arrangement 100 for implementing locked printing on a printing device that includes intruder detection and management, according to an embodiment of the invention. Arrangement 100 includes client devices 102, 104 and a printing device 106 communicatively coupled via a network 108.

Client devices 102, 104 may be implemented by any type of client device. Example implementations of client devices 102, 104 include, without limitation, workstations, personal computers, laptop computers, personal digital assistants (PDAs), cellular telephony devices and any type of mobile devices. In the example arrangement 100 depicted in FIG. 1, client device 102 is configured with an application 110 and a print driver 112. Application 110 may be any type of application process. Examples of application 110 include, without limitation, a word processor, a spreadsheet program and an email client. Print driver 112 is configured to provide a user interface for a user to specify that locked printing is to be used to print particular print data. Print driver 112 is also configured to process data from application 110 and generate print data that is provided to printing device 106 for processing. Thus, application 110 and print driver 112 operate together to generate and provide print data to printing device 106. In the example arrangement 100 depicted in FIG. 1, client device 104 is a generic client device. Client devices 102, 104 may be configured with other mechanisms, processes and functionality, depending upon a particular implementation.

Printing device 106 may be implemented by any type of device that is capable of processing print data and generating printed versions of electronic documents reflected in the print data. In example arrangement 100, printing device 106 includes a user interface 114, a print module 116, a locked print module 118 and storage 120. Printing device 106 may be configured with other mechanisms, processes and functionality, depending upon a particular implementation, and the approach described herein for implementing locked printing on a printing device is not limited to any particular type of printing device 106. For example, printing device 106 may be a multi-function peripheral (MFP) that includes any combination of printing, copying, facsimile and scanning capability, etc.

User interface 114 may be any mechanism and/or medium that provides for the exchange of information between a user and printing device 106. Examples of user interface 114 include, without limitation, a control panel with a display and keypad or keyboard, a cathode ray tube (CRT), a liquid crystal display (LCD), a keyboard, touchpad, mouse, trackball, a microphone and speakers, and any combination thereof. Printing device 106 may be configured to display information on user interface 114 in any number of languages, depending upon a particular implementation. As with conventional printing devices, the user interface 114 on printing device 106 may provide limited capability to easily enter alphanumeric strings.

Print module 116 may be implemented by one or more processes for processing print data received from client device 104 and for generating a printed version of an electronic document reflected in the print data. Print module 116 and locked print module 118 may be implemented as resident processes on printing device 106. Alternatively, print module 116 and locked print module 118 may be made available to printing device 106 on a removable media or may be implemented at a remote location with respect to printing device 106. Locked print module may be implemented by one or more processes for providing locked print services on printing device 106.

Storage 120 may be implemented by any type of storage, including volatile storage, non-volatile storage, or any combination of volatile and non-volatile storage. Examples of storage 120 include, without limitation, random access memory (RAM) and one or more disks.

Network 108 may be implemented by any type of medium and/or mechanism (wired or wireless) that facilitates the exchange of information between client device 104, printing device 106 and client device 104. Furthermore, network 108 may use any type of communications protocol and may be secured or unsecured, depending upon the requirements of a particular application.

The components and processes depicted in FIG. 1 and described herein may be implemented in hardware, software, or any combination of hardware or software, depending upon a particular implementation.

Figure 2:
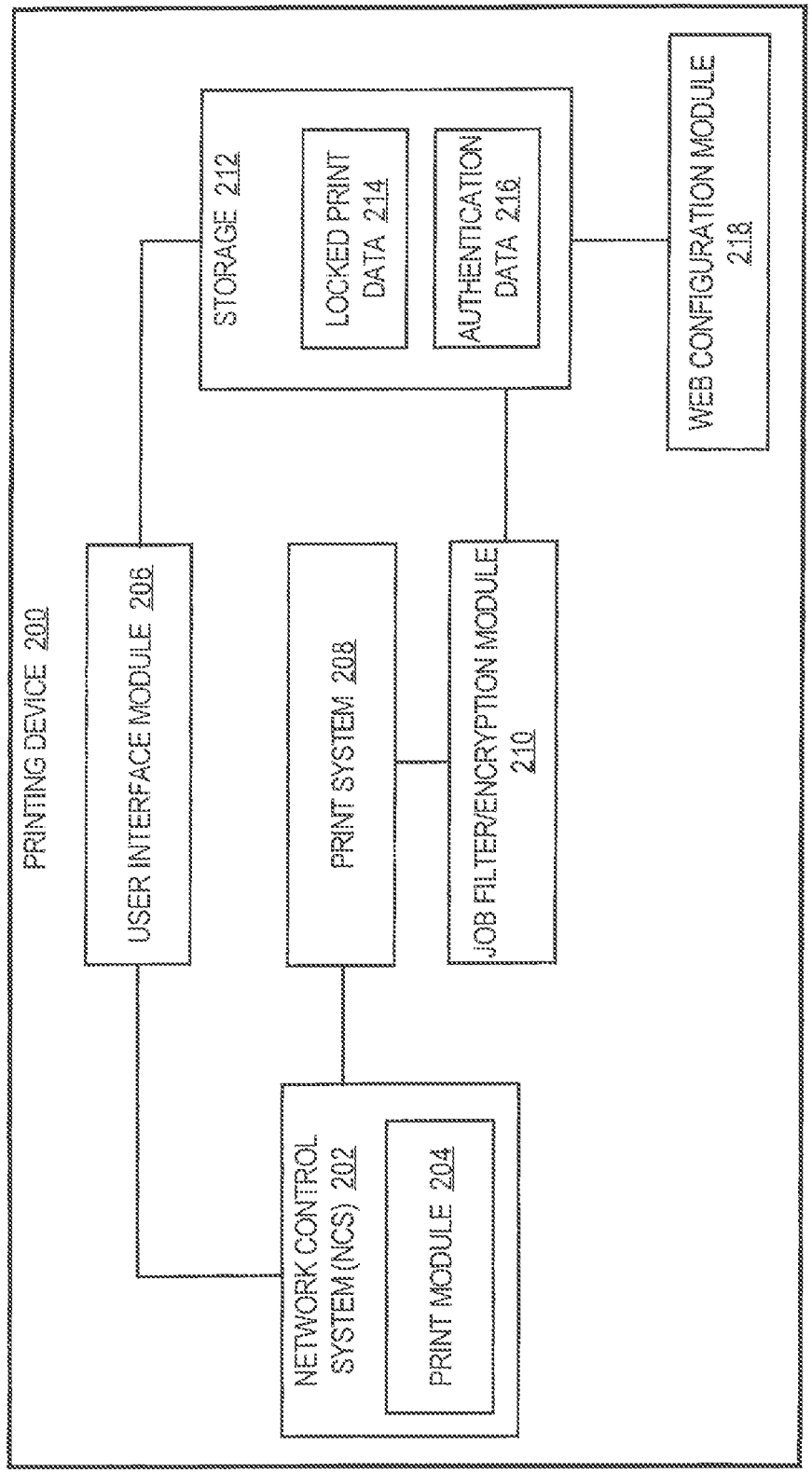
FIG. 2 is a block diagram that depicts an example implementation of locked print module, according to one embodiment of the invention.

FIG. 2 is a block diagram that depicts an example implementation of a printing device 200, according to another embodiment of the invention. In this example, printing device 200 includes a network control system (NCS) 202 that performs initial processing of print data received by printing device 200. The NCS 202 includes a print module 204. Printing device 200 includes a user interface module 206 that may include, for example, an operation panel and supporting hardware and software. The user interface module 206 is configured to display information to users and receive user input from users, for example, via a keypad, function buttons, touchpad, etc. User interface module 206 includes controls that allow a user to enter authentication data. For example, a user may select a user ID assigned to them and then enter a password associated with their user ID. User interface module 206 also includes controls for allowing a user to select locked print data for printing. As described in more detail hereinafter, once a user has been authenticated, the user is given access to locked print data associated with that user. For example, a list of print jobs or electronic documents associated with the user (via the user ID) may be displayed on a user interface and the user is allowed to select one or more of the print jobs or electronic documents for printing.

Printing device 202 includes a print system 208 that is configured with language parsers, rasterization and engine control modules. A job filter/encryption module 210 encrypts and/or decrypts print data and is also configured to examine print data to determine whether locked printing is specified for electronic documents contained in the print data. If locked printing is not specified for an electronic document contained in print data, then the print data is processed by print module 204 and the electronic document is printed. If locked printing is specified for an electronic document contained in print data, then the print data is stored to storage 212 instead of being immediately processed by print module 204. As depicted in FIG. 2, storage 212 includes locked print data 214 and authentication data 216. The locked print data 214 is print data that has been designated as locked print data and is therefore stored on storage 212 instead of being immediately printed. The authentication data 216 is data used to authenticate users for providing access to locked print data 214. The authorization data 216 may include, for example, user ID/password pairs. The authorization data 216 may also indicate locked print data 214 associated with each user ID. A Web configuration module 218 allows a user, such as an administrator, to configure locked print functionality on printing device 200.

III. PROCESSING PRINT DATA USING LOCKED PRINTING

FIG. 3 is a flow diagram 300 that depicts an approach for printing an electronic document using locked printing. In step 302, a user initiates locked printing of an electronic document. For example, a user of client device 102 initiates printing of an electronic document via application 110 and designates locked printing for the electronic document, e.g., via a checkbox or other options in a printing dialog box.

In step 304, print data is generated by print driver 112 and the print data indicates that the electronic document reflected in the print data is a locked print electronic document. For example, the print data, or a header associated with the print data, may include one or more Print Job Language (PJL) or Page Descriptor Language (PDL) commands that specify that the electronic document is a locked print electronic document.

In step 306, the client device 102 transmits the print data to the printing device 106 over network 108. To cause the print data to be processed by locked print module 118, the print data may be transmitted to a particular port. For example, the printing data may be transmitted to a particular Transport Control Protocol (TCP) port, such as port 9100 or 515 as two possible examples, to cause locked print module 118 to receive and process the print data. Alternatively, the print data may simply be sent to the printing device 106 and an operating system routine or other routine forwards the print data to locked print module 118 for processing.

In step 308, at the printing device, a determination is made whether the electronic document in the print data is a locked print electronic document. This may be determined, for example, by the presence of one or more commands or codes in the print data that indicate that the electronic document is a locked print electronic document. The data indicating that an electronic document is a locked print electronic document may be contained in a header portion of the print data, in the body portion of the print data, or any combination of a header portion and body portion of the print data. For example, in some implementations, the application program that generates the print data in conjunction with a print driver may create a header that is appended to the print data and the header contains one or more commands that indicate that the electronic document contained in the print data is a locked print electronic document. In FIG. 1, the locked print module 118 examines the print data to determine whether the electronic document in the print data is a locked print electronic document. In FIG. 2, the NCS 202 passes the print data to the print system 208, which interprets the print commands contained in the print data. The print system 208 passes the print data to the job filter/encryption module 210 that examines the print data to determine whether the electronic document reflected in the print data is a locked print electronic document.

In step 310, if the electronic document reflected in the print data is a locked print electronic document, then the print data is stored on the printing device and not immediately processed for printing. For example, in FIG. 1, the locked print data 122 is stored on storage 120. In FIG. 2, the locked print data 214 is stored on storage 212.

In step 312, a user requests access to locked print jobs stored on the printing device and is authenticated. For example, a user may select a locked print jobs button or icon on user interface 114 to request access to locked print jobs stored on printing device 106. Then the user is queried for user credential data, such as a user ID and password. For example, FIG. 4A depicts an example graphical user interface that may be displayed on user interface 114. This graphical user interface allows a user to select from a list of specified user names. FIG. 4B depicts an example graphical user interface screen for querying the user for a password for the selected user ID. The user credential data entered by the user, in this example a user ID and password, is then authenticated. For example, locked print module 118 may be configured to authenticate the user credential data based upon data stored locally on storage 120. This may include, for example, comparing a user ID and password pair specified in the user credential data to a list of verified user ID/password pairs. As another example, a one-way hash function may be used to generate a result based upon the user ID/password pair specified in the authentication data. The result may then be compared to a list of verified results. These are just two examples of how authentication of the user credential data may be performed and the invention is not limited to any particular authentication mechanism or approach. Instead of authenticating the user credential data locally on printing device 106, the user credential data may be authenticated remotely with respect to printing device 106. For example, locked print module 118 may cause the user credential data to be transmitted to another location, e.g., an authentication server over network 108, for authentication. Locked print module 118 receives a return indication from the other location indicating whether the authentication data was verified. In FIG. 2, user interface module 206 may be configured to verify the user credential data entered by a user via user interface module 206 using the authentication data 216 stored on storage 212.

If the user is successfully authenticated, then in step 314, the user is given access to the locked print data. For example, a list of locked print jobs associated with the user may be displayed on the user interface 114. The determination of the locked print data that is associated with particular locked print data may be made using a variety of techniques. FIG. 5 is a block diagram that depicts a job table 500 that may be included in or stored in association with locked print data 214. In this example, the job table 500 includes N number of rows of data, where each row corresponds to a print data, i.e., a print job, stored on printing device 106, or 200. The print job data contained in job table 500 includes, for each print job, a JOB ID, which is data that identifies the print job and user authentication data, in the form of a USER ID and PASSWORD. The USER ID and PASSWORD are used to authenticate a user at printing device 106 or 200. Although in FIG. 5 each print job has one associated user, it is possible for multiple users to be associated with a print job so that they can each print the print job. The print job data also includes a TIMESTAMP, which is data that indicates a time at which the print data was generated, and a JOB NAME. The print job data also includes a PAGE COUNT, which indicates the number of pages in the print data, and a PRINT COUNT, which indicates a number of times that the print data has been printed. The print job table 500 may include fewer columns of data or additional columns of data for each print job, depending upon a particular implementation, and the approach is not limited to any particular print job data. Furthermore, the print job data contained in job table 500 may be arranged and formatted in a wide variety of ways and is not limited to the example table arrangement depicted in FIG. 5.

Print data may be arranged on the user interface 114, for example, sorted by name or in an order in which the print data was received by printing device 106. The graphical user interface may also include one or more user interface objects that allow a user to select one or more print data to be processed at printing device 106 and one or more actions to be performed on those print data. For example, a user may select a user interface object associated with particular print data and then select a user interface object associated with a printing or deleting function to cause the particular print data to be processed accordingly. Users may be given different types of access to locked print data, depending upon a particular implementation. For example, users may be given access to only the print data that they generated. As another example, users may be given access to all locked print data associated with a logical group, such as a department, project, team, etc. As yet another example, an administrative user may be given access to all locked print data on a printing device so that the administrative user can properly manage the printing device. Access may be based upon the user credential data or other data stored on printing device 106. FIG. 4C depicts an example user interface screen that displays locked print jobs and provides controls for printing and deleting the locked print jobs.

In step 316, the user selects a locked print electronic document to be processed and one or more actions to be performed on the print data. In the present example, the user selects a locked print electronic document for printing and in step 318, the selected electronic document is printed.

IV. INTRUDER DETECTION AND MANAGEMENT

Figure 6:
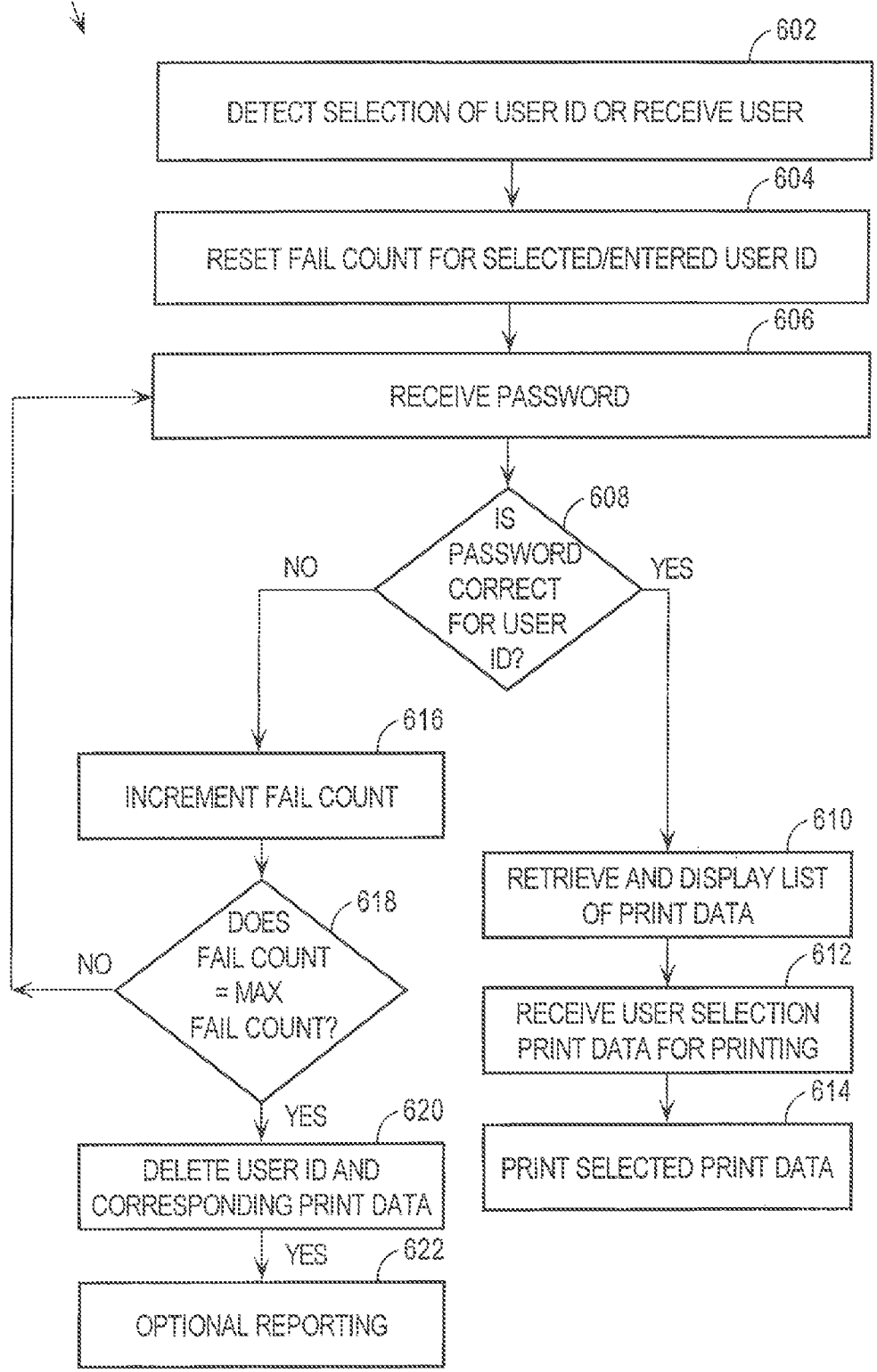
FIG. 6 is a flow diagram that depicts an approach for processing locked print data with intruder detection and management, according to one embodiment of the invention.

FIG. 6 is a flow diagram 600 that depicts an approach for processing locked print data with intruder detection and management, according to one embodiment of the invention. In step 602, a user selects or enters a user ID. For example, a list of users may be displayed on user interface 114 and the user selects a particular user from the list using a touchpad or other user interface controls. Alternatively, the user may enter a user ID via user interface 114, for example via a keyboard or keypad. In step 604, a fail count is reset for the user ID selected or entered by the user. The fail count may be a value stored in a variable and maintained by locked print module 118. In step 606, the printing device 106 receives a password from the user. For example, a user may enter the password via a keyboard, keypad or other user interface controls.

In step 608, a determination is made whether the entered password is correct for the user ID that was selected or entered by the user. This determination may be made, for example, by comparing the user ID and password entered by the user to user ID and password data stored on the printing device 106. The user ID and password data may be stored in job table 500 as previously described, with other data, or separately, depending upon a particular implementation. If, in step 608, the entered password matches the password stored on the printing device 106 for the user ID, then the user is considered to be successfully authorized and in step 610, a list of print data that corresponds to the user ID is displayed on user interface 114. The print data that corresponds to the user ID may be determined, for example, by examining job table 500. Suppose that a user selects or enters USER1 and is properly authorized by entering the correct password that corresponds to the user ID USER 1. In step 608, the locked print module 118 examines job table 500 to identify print data that has a corresponding user ID of USER1. In the present example, user ID USER 1 is associated with job 01, so this print data is displayed on user interface 114.

In step 612, a user selection of print data is received. The user selection indicates one or more print data that the user selects for printing. The user may select one or more print data via user interface 114. In step 614, the selected print data is printed.

If, in step 608, a determination is made that the password is not correct for the user ID, then in step 616, a fail count for the user ID is incremented. In step 618, a determination is made whether the current fail count is equal to a maximum fail count. If not, then control returns to step 606 and another password may be entered. This password is then verified in step 608 and if the password is correct for the user ID, then steps 610-614 are performed. If the password is not correct for the user ID, then in step 616, the fail count is again incremented and in step 618, checked against the maximum fail count. If in step 618 a determination is made that the fail count is equal to the maximum fail count, then it is likely that someone is attempting to determine the correct password for a particular user ID, e.g., by entering in several best guesses at the password. In step 620, the user ID, password and corresponding print data are deleted from the printing device 106 so that the unauthorized third party cannot gain access to the locked print data. The determination of the print data that corresponds to the user ID may be made, for example, by examining job table 500 to identify print data associated with the user ID. The print data that includes the user ID for which the fail count was satisfied is deleted from the printing device 106.

Embodiments of the invention have been described herein and depicted in the figures in the context of a one-to-one relationship between user IDs and print data. That is, that each locked print document stored on a printing device has one associated user ID that is used to determine access to the locked print documents. In some situations, print data may be associated with multiple user IDs. For example, suppose that a user A creates an electronic document that contains sensitive information and decides to use locked printing to provide better control over the printing of the electronic document. Suppose further that the application program that user A uses to create the electronic document allows multiple locked print recipients to be specified. For example, user A might indicate that user B and user C are also authorized to access the electronic document. At the printing device, any of user A, user B or user C may enter their user ID and password at the printing device to obtain access to and print the electronic document. Using the approach described herein, when the printing device detects that an incorrect password has been entered for the user ID of user A at least a specified number of times, then the print data associated with the user ID of user A is deleted from the printing device, along with the user ID and password data for user A. According to one embodiment of the invention, when some or all print data on a printing device may be associated with multiple user IDs, and the printing device detects that the fail count for the particular user ID equals the maximum fail count value, indicating detection of an intruder, then print data that is associated with only the particular user ID is deleted from the printing device. The particular user ID and corresponding password are also deleted. In this situation, print data that was associated with only the particular user ID is no longer accessible. Print data that is associated with the particular user ID and other user IDs is not deleted from the printing device and is accessible by the users associated with the other user IDS. The particular user ID cannot be used because it (and the corresponding password) have been deleted from the printing device. As an alternative to the foregoing, for additional security, all print data associated with the particular user ID may be deleted from the printing device, irrespective of whether the print data is also associated with other user IDs.

The maximum fail count used to trigger the deletion of the user ID and corresponding print data from the printing device 106 may be set to different values depending upon a particular implementation. For example, the maximum fail count may be set to a value that allows for normal data entry errors, but provides protection against repeated attempts to enter a password for a user ID, which may be indicative of an unauthorized third party attempting to gain access. One example maximum fail count value is three. Thus, if three incorrect passwords are consecutively entered for a particular user ID, then both the particular user ID and all print data associated with the particular user ID is deleted from printing device 106. A global maximum fail count value may be used for all user IDs, or individual maximum fail count values may be used for each user ID, depending upon a particular implementation. The fail count values may be specified by administrative personnel, for example via web configuration module 218, and stored on storage 212. In step 622, optional reporting may be performed, as described in more detail hereinafter.

V. NOTIFICATION OF INTRUDER DETECTIONS

As previously described herein, once a determination is made that for a particular user ID, the current fail count equals the maximum fail count, then the print data that corresponds to the particular user ID is deleted from the printing device. The particular user ID and corresponding password data may also be deleted from the printing device. According to one embodiment of the invention, a printing device is further configured to provide notification of intruder detections. The notification may take many forms. For example, a notification may be provided via the user interface 114 of printing device 106. As another example, a notification may be provided via email. The notification may include information about the intruder detection. For example, the notification may indicate the user ID and the number of failed attempts, which is typically the maximum fail count value.

VI. IMPLEMENTATION MECHANISMS

Figure 7:
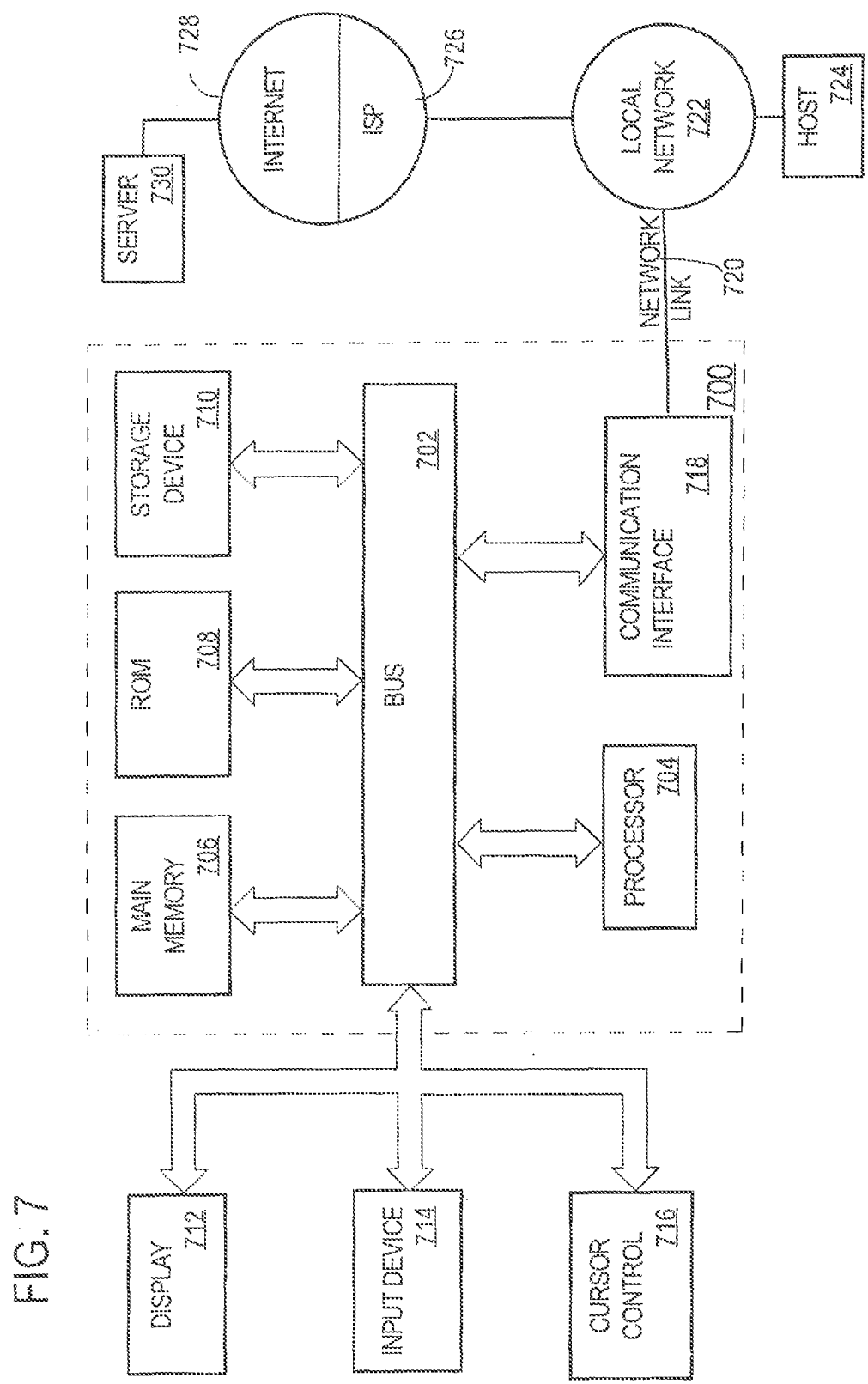
FIG. 7 is a block diagram of a computer system on which embodiments of the invention may be implemented.

The approach described herein for printing locked print electronic documents may be implemented on any type of computing platform or architecture. For purposes of explanation, FIG. 7 is a block diagram that depicts an example computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   a user interface configured to display information to users and receive user input from the users;
   a print module configured to process print data and cause a printed version of an electronic document contained in the print data to be generated by the printing device; and
   a locked print module configured to:
   examine a plurality of print data received by the printing device to determine whether locked printing is specified for any electronic documents contained in the plurality of print data,
   if, for any of the print data from the plurality of print data, locked printing is specified for the electronic document contained in the print data, then cause the print data, from the plurality of print data, for which locked printing is specified for the electronic document contained in the print data, to be stored at the printing device as locked print data instead of being processed for printing, for user identification data and password data received via the user interface of the printing device, verify the password data with respect to the user identification data, in response to the password data being successfully verified with respect to the user identification data, allowing user access to print data associated with the user identification data, in response to the password data not being successfully verified with respect to the user identification data:
incrementing a fail count,
comparing the fail count to a specified value,
in response to comparing the fail count to the specified value, then causing locked print data that is both stored on the printing device and associated with the user identification data to be deleted from the printing device.

2. The printing device as recited in claim 1, wherein the locked print data that is both stored on the printing device and associated with the user identification data is deleted from the printing device in response to the fail count being equal to or greater than the specified value.

3. The printing device as recited in claim 1, wherein the fail count is specific to the user identification data.

4. The printing device as recited in claim 1, wherein the locked print module is further configured to reset the fail count prior to verifying the password data with respect to the user identification data.

5. The printing device as recited in claim 1, wherein the specified value is a maximum fail count.

6. The printing device as recited in claim 1, wherein the locked print module is further configured to cause the user identification data to be deleted from the printing device in response to comparing the fail count to the specified value.

7. The printing device as recited in claim 1, wherein causing locked print data that is both stored on the printing device and associated with the user identification data to be deleted from the printing device includes causing locked print data that is both stored on the printing device and associated with only the user identification data from a plurality of user identification data to be deleted from the printing device.

8. The printing device as recited in claim 1, wherein:
the print data is first print data, and
the locked print module is further configured to, in response to the password data not being successfully verified with respect to the user identification data:
determine whether second print data that is stored on the printing device is associated with other user identification data from a plurality of user identification data, wherein the second print data is different than the print data, and
if the second print data that is stored on the printing device is associated with other user identification data from the plurality of user identification data, then deleting the user identification data and the password data from the printing device and not deleting the second print data from the printing device.

9. One or more non-transitory computer-readable media storing instructions which, when processed by one or more processors, cause:
a user interface of a computing device to display information to users and receive user input from the users;
a print module of the computing device to process print data and cause a printed version of an electronic document contained in the print data to be generated by the computing device; and
a locked print module of the computing device to:
examine a plurality of print data received by the computing device to determine whether locked printing is specified for any electronic documents contained in the plurality of print data,
if, for any of the print data from the plurality of print data, locked printing is specified for the electronic document contained in the print data, then cause the print data, from the plurality of print data, for which locked printing is specified for the electronic document contained in the print data, to be stored at the computing device as locked print data instead of being processed for printing,
for user identification data and password data received via the user interface of the computer device, verify the password data with respect to the user identification data,
in response to the password data being successfully verified with respect to the user identification data, allowing user access to print data associated with the user identification data,
in response to the password data not being successfully verified with respect to the user identification data:
incrementing a fail count,
comparing the fail count to a specified value,
in response to comparing the fail count to the specified value, then causing locked print data that is both stored on the computing device and associated with the user identification data to be deleted from the computing device.

10. The one or more non-transitory computer-readable media as recited in claim 9, wherein the locked print data that is both stored on the computing device and associated with the user identification data is deleted from the computing device in response to the fail count being equal to or greater than the specified value.

11. The one or more non-transitory computer-readable media as recited in claim 9, wherein the fail count is specific to the user identification data.

12. The one or more non-transitory computer-readable media as recited in claim 9, wherein the locked print module is further configured to reset the fail count prior to verifying the password data with respect to the user identification data.

13. The one or more non-transitory computer-readable media as recited in claim 9, wherein the specified value is a maximum fail count.

14. The one or more non-transitory computer-readable media as recited in claim 9, wherein the locked print module is further configured to cause the user identification data to be deleted from the computing device in response to comparing the fail count to the specified value.

15. The one or more non-transitory computer-readable media as recited in claim 9, wherein causing locked print data that is both stored on the computing device and associated with the user identification data to be deleted from the computing device includes causing locked print data that is both stored on the computing device and associated with only the user identification data from a plurality of user identification data to be deleted from the computing device.

16. The one or more non-transitory computer-readable media as recited in claim 9, wherein:

the print data is first print data, and the one or more non-transitory computer-readable media store additional instructions which, when processed by the one or more processors, cause the locked print module to, in response to the password data not being successfully verified with respect to the user identification data:

determine whether second print data that is stored on the computing device is associated with other user identification data from a plurality of user identification data, wherein the second print data is different than the print data, and if the second print data that is stored on the computing device is associated with other user identification data from the plurality of user identification data, then deleting the user identification data and the password data from the computing device and not deleting the second print data from the computing device.

17. A computer-implemented method comprising:

a user interface of a computing device displaying information to users and receive user input from the users;

a print module of the computing device processing print data and causing a printed version of an electronic document contained in the print data to be generated by the computing device; and a locked print module of the computing device:

examining a plurality of print data received by the computing device to determine whether locked computing is specified for any electronic documents contained in the plurality of print data, if, for any of the print data from the plurality of print data, locked computing is specified for the electronic document contained in the print data, then causing the print data, from the plurality of print data, for which locked computing is specified for the electronic document contained in the print data, to be stored at the computing device as locked print data instead of being processed for printing, for user identification data and password data received via the user interface of the computing device, verifying the password data with respect to the user identification data, in response to the password data being successfully verified with respect to the user identification data, allowing user access to print data associated with the user identification data, in response to the password data not being successfully verified with respect to the user identification data:

incrementing a fail count, comparing the fail count to a specified value, in response to comparing the fail count to the specified value, then causing locked print data that is both stored on the computing device and associated with the user identification data to be deleted from the computing device.

18. The computer-implemented method as recited in claim 17, wherein the locked print data that is both stored on the computing device and associated with the user identification data is deleted from the computing device in response to the fail count being equal to or greater than the specified value.

19. The computer-implemented method as recited in claim 17, wherein the fail count is specific to the user identification data.

20. The computer-implemented method as recited in claim 17, wherein:

the print data is first print data, and the computer-implemented method further comprises the locked print module, in response to the password data not being successfully verified with respect to the user identification data:

determining whether second print data that is stored on the computing device is associated with other user identification data from a plurality of user identification data, wherein the second print data is different than the print data, and if the second print data that is stored on the computing device is associated with other user identification data from the plurality of user identification data, then deleting the user identification data and the password data from the computing device and not deleting the second print data from the computing device.

\* \* \* \* \*